US008963814B2

(12) United States Patent
Kim et al.

(10) Patent No.: US 8,963,814 B2
(45) Date of Patent: Feb. 24, 2015

(54) ORGANIC LIGHT EMITTING DISPLAY DEVICE AND METHOD OF DRIVING THE SAME

(75) Inventors: Do-Ik Kim, Yongin (KR); Jae-Woo Ryu, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 1275 days.

(21) Appl. No.: 12/490,201

(22) Filed: Jun. 23, 2009

(65) Prior Publication Data

US 2010/0020051 A1 Jan. 28, 2010

(30) Foreign Application Priority Data

Jul. 28, 2008 (KR) ........................ 10-2008-0073542

(51) Int. Cl.

| | |
|---|---|
| ***G09G 3/30*** | (2006.01) |
| ***G06F 3/038*** | (2013.01) |
| ***G09G 5/00*** | (2006.01) |
| ***G09G 3/32*** | (2006.01) |

(52) U.S. Cl.

CPC ........ *G09G 3/3233* (2013.01); *G09G 2320/043* (2013.01); *G09G 2320/045* (2013.01); *G09G 2320/048* (2013.01); *G09G 2360/145* (2013.01)

USPC ................................ 345/77; 345/76; 345/207

(58) Field of Classification Search

USPC ..................... 345/76–83, 204–215, 690–699; 315/169.1–169.4

See application file for complete search history.

(56) References Cited

U.S. PATENT DOCUMENTS

| | | | | |
|---|---|---|---|---|
| 6,023,259 | A * | 2/2000 | Howard et al. | 345/76 |
| 6,351,077 | B1 * | 2/2002 | Koyama | 315/169.3 |
| 7,006,026 | B2 * | 2/2006 | Jo | 341/144 |
| 7,088,051 | B1 * | 8/2006 | Cok | 315/169.1 |
| 7,719,495 | B2 * | 5/2010 | Lee et al. | 345/77 |
| 7,777,735 | B2 * | 8/2010 | Choi et al. | 345/204 |
| 8,059,140 | B2 * | 11/2011 | Kwon et al. | 345/690 |
| 2006/0208973 | A1 * | 9/2006 | Lee et al. | 345/76 |
| 2008/0291224 | A1 * | 11/2008 | Ishii et al. | 345/690 |

FOREIGN PATENT DOCUMENTS

| | | |
|---|---|---|
| JP | 2006-343763 | 12/2006 |
| KR | 10-2006-0128464 | 12/2006 |
| KR | 10-2007-0019882 | 2/2007 |
| KR | 10-2007-0062836 | 6/2007 |

(Continued)

OTHER PUBLICATIONS

KIPO Office action dated Mar. 31, 2010, for priority Korean Patent application 10-2008-0073542.

(Continued)

*Primary Examiner* — Patrick F Marinelli

(74) *Attorney, Agent, or Firm* — Christie, Parker & Hale, LLP

(57) ABSTRACT

A method of driving an organic light emitting display device including a plurality of pixels during a frame including subframes includes: representing gray levels by utilizing some of the subframes of the frame prior to degradation of an organic light emitting diode of each of the plurality of pixels; and compensating for the degradation of the organic light emitting diodes by changing the utilized subframes to increase a portion of the frame utilized by the plurality of pixels to represent the gray levels.

15 Claims, 5 Drawing Sheets

(56) References Cited

FOREIGN PATENT DOCUMENTS

| | | |
|---|---|---|
| KR | 10-2008-0002226 | 1/2008 |
| KR | 10-2008-0028222 | 3/2008 |

OTHER PUBLICATIONS

Korean Office action dated Dec. 17, 2009, for priority Korean application 10-2008-0073542.

* cited by examiner

ORGANIC LIGHT EMITTING DISPLAY DEVICE AND METHOD OF DRIVING THE SAME

CROSS-REFERENCE TO RELATED APPLICATION

This application claims priority to and the benefit of Korean Patent Application No. 10-2008-0073542, filed on Jul. 28, 2008, in the Korean Intellectual Property Office, the entire content of which is incorporated herein by reference.

BACKGROUND OF THE INVENTION

1. Field of the Invention

The present invention relates to an organic light emitting display device and a method of driving the same.

2. Description of Related Art

In recent years, various flat panel display devices have been developed which are lightweight and smaller when compared to cathode ray tubes (CRTs). Flat display panels include liquid crystal display (LCD) devices, field emission display (FED) devices, plasma display panels (PDPs), and organic light emitting display devices among others.

Among the flat display panels, the organic light emitting display device (or OLED display device) displays an image by using organic light emitting diodes (OLEDs) that generate light by means of recombination of electrons and holes. The organic light emitting display device is advantageous in that it has a fast response time, and is driven with low power consumption.

FIG. 1 is a circuit diagram showing a pixel in a conventional organic light emitting display device.

Referring to FIG. 1, the pixel 4 of the organic light emitting display device includes an organic light emitting diode (OLED) and a pixel circuit 2 coupled to a data line (Dm) and a scan line (Sn) to control the organic light emitting diode (OLED).

An anode electrode of the organic light emitting diode (OLED) is coupled to the pixel circuit 2, and a cathode electrode of the organic light emitting diode (OLED) is coupled to a second power source (ELVSS). The organic light emitting diode (OLED) generates light with a brightness corresponding to an electric current supplied from the pixel circuit 2.

The pixel circuit 2 controls an amount of current supplied to the organic light emitting diode (OLED) corresponding to a data signal supplied to the data line (Dm) when a scan signal is supplied to the scan line (Sn). For this purpose, the pixel circuit 2 includes a second transistor (M2) coupled between a first power source (ELVDD) and the organic light emitting diode (OLED), a first transistor (M1) coupled between the data line (Dm) and a gate electrode of the second transistor (M2), and a storage capacitor (C) coupled between the gate electrode and a first electrode of the second transistor (M2).

A gate electrode of the first transistor (M1) is coupled to the scan line (Sn), and a first electrode of the first transistor (M1) is coupled to the data line (Dm). A second electrode of the first transistor (M1) is coupled to a first terminal of the storage capacitor (C). Here, the first electrode is one of a source electrode and a drain electrode, and the second electrode is the other of the source electrode and the drain electrode. For example, when the first electrode is a source electrode, the second electrode is a drain electrode. When a scan signal is supplied from the scan line (Sn), the first transistor (M1) is turned on to supply a data signal from the data line (Dm) to the storage capacitor (C). In this case, the storage capacitor (C) charges a voltage corresponding to the data signal.

A gate electrode of the second transistor (M2) is coupled to the first terminal of the storage capacitor (C), and a first electrode of the second transistor (M2) is coupled to a second terminal of the storage capacitor (C) and the first power source (ELVDD). A second electrode of the second transistor (M2) is coupled to an anode electrode of the organic light emitting diode (OLED). The second transistor (M2) controls an amount of current corresponding to a voltage stored in the storage capacitor (C), the current being supplied from the first power source (ELVDD) to the second power source (ELVSS) via the organic light emitting diode (OLED). In this case, the organic light emitting diode (OLED) generates light corresponding to the current supplied from the second transistor (M2).

The pixel 4 of the organic light emitting display device displays an image by repeating the above-mentioned operations. Meanwhile, the first power source (ELVDD) and the second power source (ELVSS) are supplied to the organic light emitting diode (OLED) in a digital driving mode in which the second transistor (M2) functions as a switch, and therefore the organic light emitting diode (OLED) is driven at a constant voltage to emit light. Such a digital driving mode is advantageous in that the organic light emitting display device may display an image regardless of a non-uniform threshold voltage of the second transistor (M2).

However, since a constant voltage is applied to the organic light emitting diode (OLED) in the digital driving mode, the organic light emitting diode (OLED) may be rapidly degraded, therefore making it very difficult to display an image with uniform brightness.

SUMMARY OF THE INVENTION

Accordingly, exemplary embodiments of the present invention provide an organic light emitting display device capable of displaying an image with substantially uniform brightness, and a method of driving the same.

An exemplary embodiment of the present invention provides a method of driving an organic light emitting display device including a plurality of pixels during a frame including subframes, the method including: representing gray levels by utilizing some of the subframes of the frame prior to degradation of an organic light emitting diode of each of the plurality of pixels; and compensating for the degradation of the organic light emitting diodes by changing the utilized subframes to increase a portion of the frame utilized by the plurality of pixels to represent the gray levels.

Another exemplary embodiment of the present invention provides a method of driving an organic light emitting display device including a plurality of pixels during a frame including subframes, the method including: representing a gray level by setting data signals to utilize some of the subframes of the frame prior to degradation of an organic light emitting diode of each of the plurality of pixels; and representing substantially a same gray level as said gray level by adjusting the data signals to compensate for the degradation of the organic light emitting diodes.

Still another exemplary embodiment of the present invention provides an organic light emitting display device, including: a scan driver for supplying scan signals to a plurality of scan lines during subframes of a frame; a data driver for generating image data signals utilizing second data and a dummy data signal utilizing dummy data; a plurality of pixels in an active region of the organic light emitting display device configured to emit light in accordance with the image data signals; a dummy pixel in a dummy region of the organic light emitting display device configured to emit light in accordance with the dummy data signal; a degradation compensator for adjusting a bit value of the dummy data to maintain a substantially constant brightness of the dummy pixel by adjusting a light emitting period of the frame for the dummy pixel, and for storing the adjusted bit value; and a timing controller for summing first data for each of the plurality of pixels to generate integrated data, and for generating the second data by adjusting the first data in accordance with the adjusted bit value and the integrated data.

The organic light emitting display device according to exemplary embodiments of the present invention, and the method of driving the same, may be useful to display an image with substantially uniform brightness by controlling a light emitting time of each of the pixels to compensate for the degradation of the organic light emitting diode included in each of the pixels.

BRIEF DESCRIPTION OF THE DRAWINGS

The accompanying drawings illustrate exemplary embodiments of the present invention, and, together with the description, serve to explain the principles of the present invention.

DETAILED DESCRIPTION OF EXEMPLARY EMBODIMENTS

Figure 1:
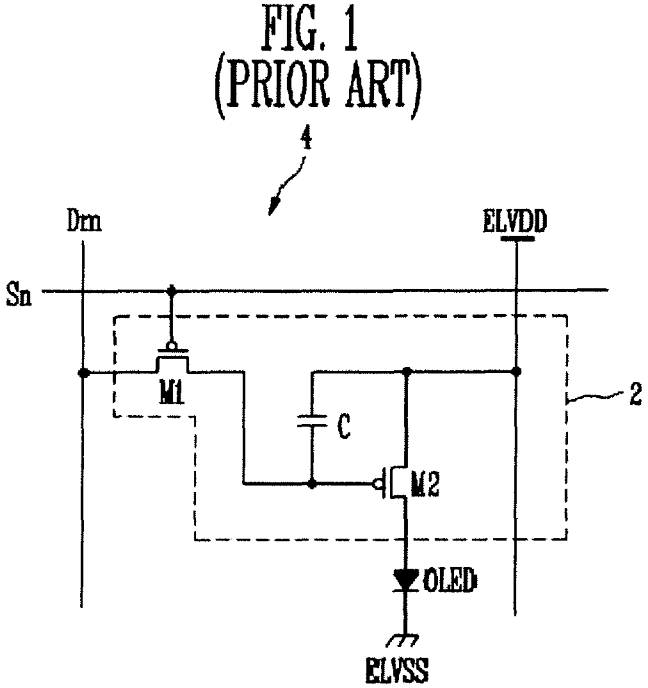
FIG. 1 (PRIOR ART)
FIG. 1 is a circuit diagram showing a pixel of a conventional organic light emitting display device.

Hereinafter, certain exemplary embodiments according to the present invention will be described with reference to the accompanying drawings. Here, when a first element is described as being coupled to a second element, the first element may be directly coupled to the second element, or may be indirectly coupled to the second element via one or more additional elements. Further, some elements that are not essential to the complete understanding of the invention are omitted for clarity. Also, like reference numerals refer to like elements throughout.

Figure 2:
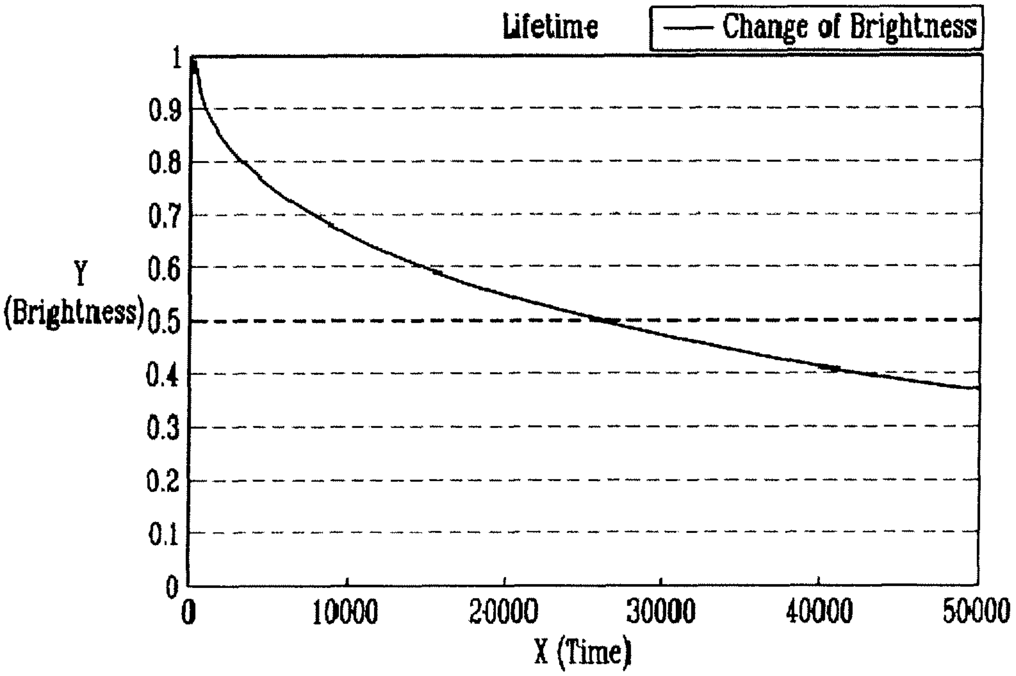
FIG. 2 is a graph showing brightness characteristics of conventional organic light emitting diode.

FIG. 2 is a graph showing brightness characteristics of an organic light emitting diode. In FIG. 2, the X-axis (or horizontal axis) represents time, and the Y-axis (or vertical axis) represents brightness. Here, brightness is expressed based on a scale between 0 and 1.

Referring to FIG. 2, the organic light emitting diode degrades with time in a digital driving mode, which leads to deteriorated brightness. In fact, an organic light emitting diode that emits light for approximately fifty thousand hours emits light with approximately 37% of the brightness of a new organic light emitting diode. When the organic light emitting diode is degraded, it is difficult to display an image with a desired brightness.

Figure 3:
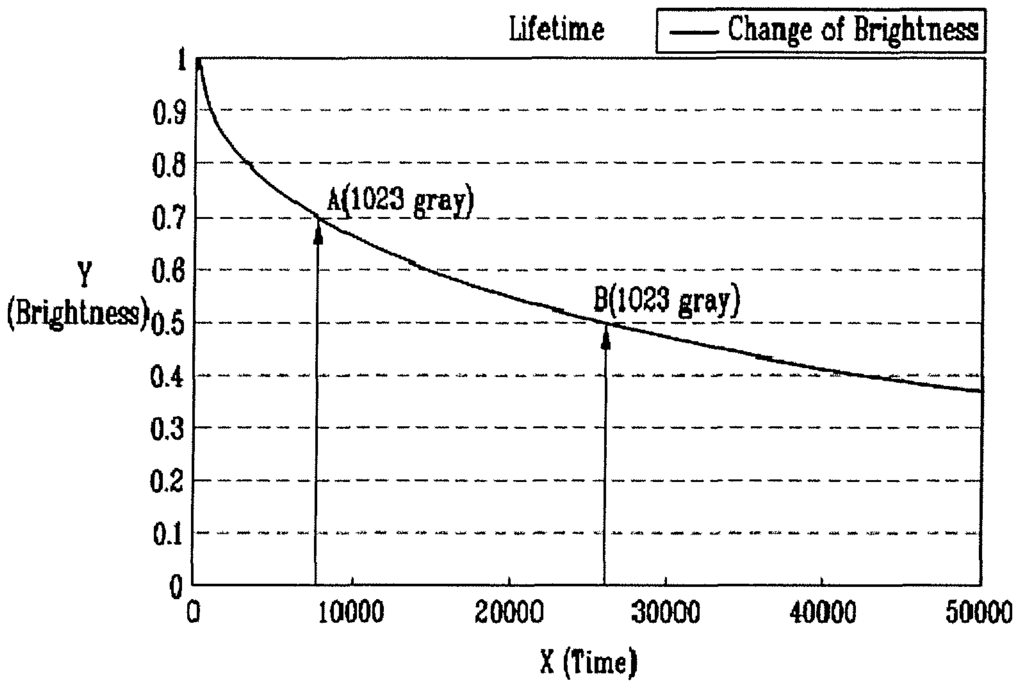
FIG. 3 is a graph showing brightness corresponding to a light emitting time of the pixel.

FIG. 3 is a graph showing the brightness corresponding to a light emitting time of a pixel.

Referring to FIG. 3, a degradation rate of an organic light emitting diode is proportional to its emission time. Therefore, an organic light emitting diode in a pixel that emits light for a relatively longer time is generally more degraded than an organic light emitting diode in a pixel that emits light for a relatively shorter time. For example, when a "B" pixel which has emitted light for a relatively long time, the "B" pixel has 50% brightness compared to an initial brightness when it presents a maximum gray level (i.e. 1023). An "A" pixel which has emitted light for a shorter time than the "B" pixel has 70% brightness compared to the initial brightness when it presents a maximum gray level. When the pixels "A" and "B" emit light with different maximum brightness as described above, it is very difficult to display an image with uniform brightness.

In order to solve the above problem, brightness of degraded pixels may be enhanced to compensate for the degradation of the organic light emitting diode. That is to say, the degradation of the organic light emitting diode is compensated for by adjusting a bit value of data associated with generating light with a desired brightness from pixels in exemplary embodiments of the present invention. Here, since the organic light emitting diode is driven in a digital driving mode according to exemplary embodiments of the present invention, a light emitting time of one frame may be controlled under the control of the bit value of data.

Figure 4A:
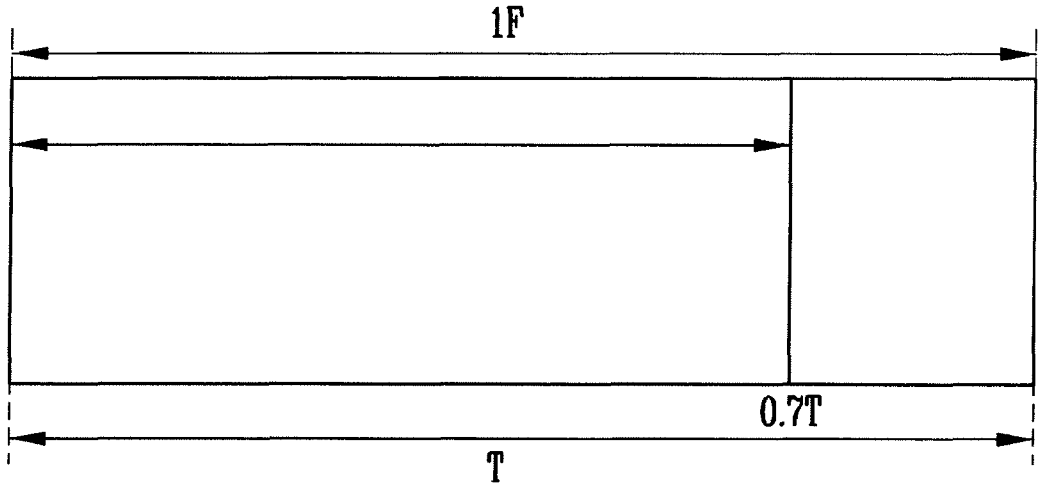
FIG. 4A and FIG. 4B are timing diagrams showing a degradation compensation principle according to one exemplary embodiment of the present invention.
Figure 4B:
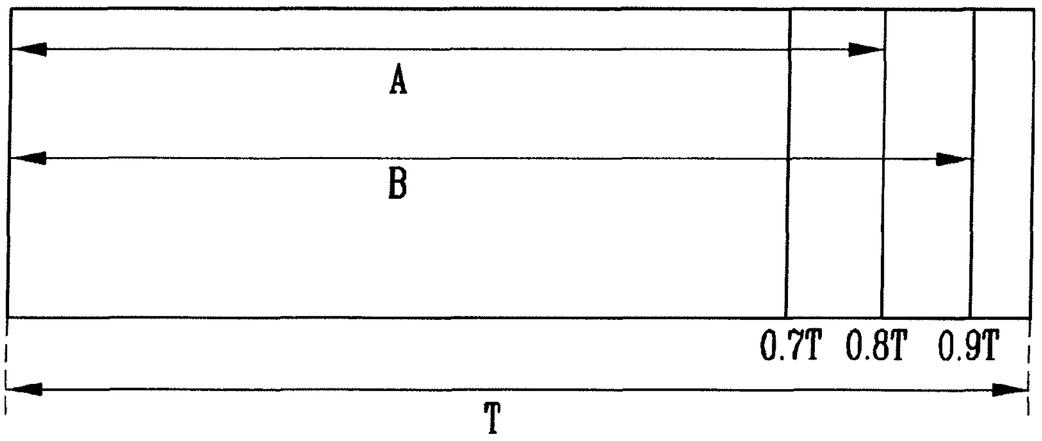

FIG. 4A and FIG. 4B are timing diagrams showing a degradation compensation principle according to one exemplary embodiment of the present invention.

Referring to FIG. 4A, when one frame period is set to 'T,' pixels emit light for a period of 0.7T when the pixels are in an initial state (i.e., when organic light emitting diodes are not degraded). That is to say, when an initial state of the pixels emit light with the highest gray level, the pixels emit light for 70% of one frame period (T).

Then, the light emitting time of the pixels are gradually increased to compensate for the degradation of the organic light emitting diode of each of the pixels, as shown in FIG. 4B. Then, it may be possible to display an image with substantially uniform brightness since the degradation of the organic light emitting diode of each of the pixels is compensated. For example, a light emitting time of an "A" pixel may be adjusted so that the "A" pixel emits light for a period of 0.8T at the highest gray level, and a light emitting time of a "B" pixel may be adjusted so that the "B" pixel emits light for a period of 0.9T at the highest gray level.

A bit value of data is changed to control a light emitting time of the pixels during one frame period (T). For example, a bit value of data corresponding to the highest gray level may be set to "01111111" when the organic light emitting diode is in an initial state. A light emitting time of each of the pixels is increased when a bit value of data is increased to compensate for the degradation of the organic light emitting diode of each pixel, as shown in FIG. 4B.

Figure 5:
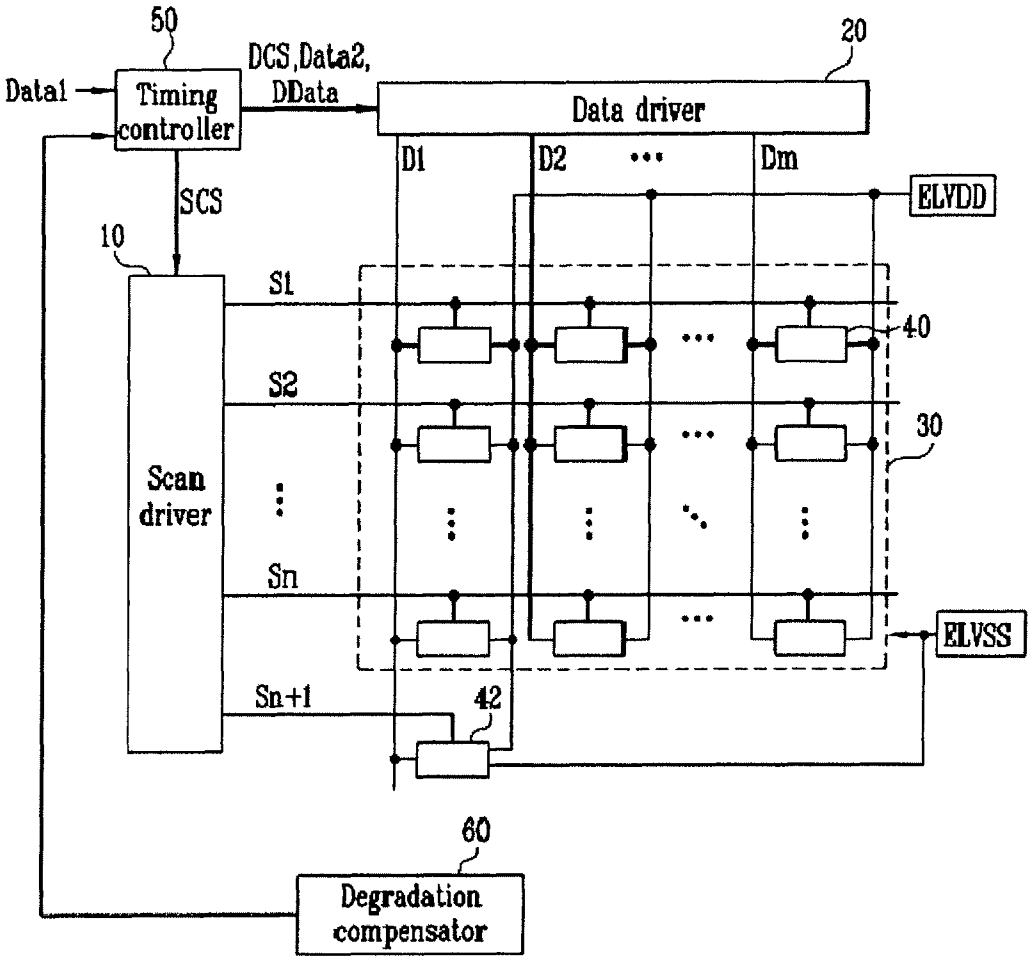
FIG. 5 is a schematic block diagram showing an organic light emitting display device according to one exemplary embodiment of the present invention.

FIG. 5 is a schematic block diagram showing an organic light emitting display device according to one exemplary embodiment of the present invention.

Referring to FIG. 5, the organic light emitting display device according to one exemplary embodiment of the present invention includes a plurality of pixels 40 coupled to scan lines (S1 to Sn+1) and data lines (D1 to Dm) and disposed in an active region 30; a dummy pixel 42 coupled to scan line (Sn+1) and data line (D1) and disposed in a dummy region; a scan driver 10 for driving the scan lines (S1 to Sn+1); a data driver 20 for driving the data lines (D1 to Dm); a timing controller 50 for controlling the scan driver 10 and the data driver 20; and a degradation compensator 60 for compensating for the degradation of the organic light emitting diode of each of the pixels 40.

Each of the pixels 40 receives a first power source (ELVDD) and a second power source (ELVSS) from the outside. Each of the pixels 40 receives a data signal in accordance with a scan signal, and emits or does not emit light based on the received data signal. Such pixels 40 are disposed in the active region 30 and display an image. Each of the pixels 40 may be realized with various forms of circuits that may be applied in a digital driving mode, for example, the same circuit as the pixel shown in FIG. 1.

The dummy pixel 42 receives a first power source (ELVDD) and a second power source (ELVSS) from the outside. The dummy pixel 42 receives a data signal in accordance with a scan signal, and emits light based on the received data signal. The dummy pixel 42 is disposed in a dummy region so that it is not visible. That is to say, the dummy pixel 42 may be overlapped with a black matrix or an insulating material so that it is not visible from the outside.

The scan driver 10 sequentially supplies a scan signal to scan lines (S1 to Sn+1) during the scan periods of a plurality of subframes of a frame. When the scan signal is sequentially supplied to the scan lines (S1 to Sn+1), rows of the pixels 40 and the dummy pixel 42 are sequentially selected, and data signals are supplied to the selected pixels 40 and/or the dummy pixel 42.

The data driver 20 supplies a data signal to data lines (D1 to Dm) when the scan signal is supplied to the scan lines (S1 to Sn+1) during the scan period of the subframe. Here, the data driver 20 supplies a data signal, for example, an emit data signal directing a pixel to emit light or a non-emit data signal directing a pixel not to emit light. Then, the pixels 40 receiving the first data signal display an image with a corresponding brightness by emitting light during a light emitting period (e.g., light emitting subframe period). Also, the data driver 20 controls the light emission of the dummy pixel 42 by supplying either the emit data signal or the non-emit data signal to the dummy pixel 42.

The timing controller 50 generates a data drive control signal (DCS) and a scan drive control signal (SCS) corresponding to synchronization signals (not shown) supplied from the outside. The data drive control signal (DCS) generated in the timing controller 50 is supplied to the data driver 20, and the scan drive control signal (SCS) is supplied to the scan driver 10.

Also, the timing controller 50 generates an integrated data by integrating (summing) first data (Data1) corresponding to each of the pixels 40 (i.e., first data information is integrated on a per pixel basis), and stores the integrated data in a memory (not shown). Here, the integrated data stored in the memory includes information on the light emitting times of each of the pixels 40. In order to compensate for the degradation of the organic light emitting diode included in each of the pixels 40, the timing controller 50 then generates second data (Data2) (e.g., image data signals) by adjusting bit values of the first data (Data1) in accordance with the degradation compensator 60 and the integrated data, and supplies the second data (Data2) to the data driver 20. Also, the timing controller 50 transfers the dummy data (DData) (e.g., dummy data signals) supplied from the degradation compensator 60 to the data driver 20.

The degradation compensator 60 measures a brightness of the dummy pixel 42, and adjusts a bit value of the dummy data (DData) to maintain a substantially constant brightness of the measured dummy pixel 42. The degradation compensator 60 stores a bit value of the adjusted dummy data (DData) with the time information in the memory (not shown), and supplies the dummy data (DData) and the information stored in the memory to the timing controller 50.

Figure 6:
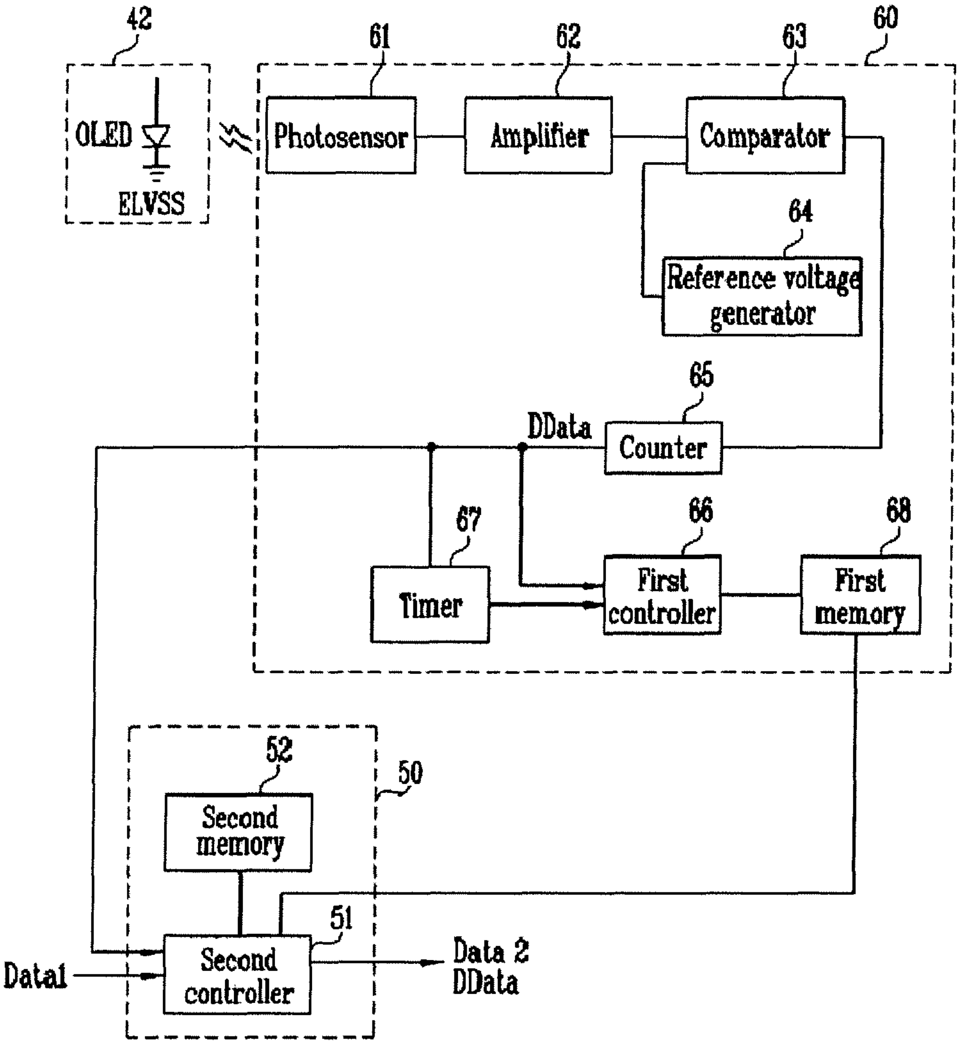
FIG. 6 is a diagram showing a degradation compensator and a timing controller as shown in FIG. 5.

FIG. 6 is a schematic block diagram showing a degradation compensator and a timing controller as shown in FIG. 5.

Referring to FIG. 6, the degradation compensator 60 according to one exemplary embodiment of the present invention includes a photosensor 61, an amplifier 62, a comparator 63, a reference voltage generator 64, a counter 65, a first controller 66, a timer 67, and a first memory 68.

The photosensor 61 senses an amount of light generated in the organic light emitting diode (OLED) of the dummy pixel 42 per frame, and generates a sense voltage corresponding to the sensed light. That is to say, the photosensor 61 measures the brightness of light generated in the dummy pixel 42 during a frame period.

The amplifier 62 amplifies the sense voltage and supplies an amplified sense voltage to the comparator 63.

The comparator 63 compares the amplified sense voltage with a reference voltage supplied from the reference voltage generator 64, and supplies a signal corresponding to the comparison result to the counter 65.

The reference voltage generator 64 supplies a constant reference voltage to the comparator 63. Here, the reference voltage is set as a theoretical amplified sense voltage that would be generated in the amplifier 62 if light with a desired constant brightness is generated in the dummy pixel 42.

More particularly, the dummy pixel 42 receives a data signal in the dummy data (DData) to emit light. The dummy data (DData) includes a gray level value for generating a constant brightness. For example, the dummy data (DData) has a bit value corresponding to a maximum gray level when the dummy data (DData) is in an initial state (i.e., the dummy data (DData) has a bit value with which pixels emit light during a 0.7T period as shown in FIG. 4A). The reference voltage generator 64 may generate a reference voltage and may supply the reference voltage to the comparator 63, the reference voltage corresponding to an estimated sense voltage if the dummy pixel 42 were new (i.e. before the organic light emitting diode is degraded).

The counter 65 increases or drops a bit value of the dummy data (DData) so that the sense voltage may be set to the same voltage as the reference voltage supplied from the comparator 63. In general, as the organic light emitting diode (OLED) becomes degraded, the amount of light generated during one frame period is reduced, and therefore a detected sense voltage may become gradually lower than the reference voltage. In this case, the counter 65 may increase a light emitting time of the dummy pixel 42 during one frame period by increasing a bit value of the dummy data (DData).

That is to say, the counter 65 controls a bit value of the dummy data (DData) in order to generate a sense voltage closer to the reference voltage, and therefore the amount of light generated in the dummy pixel 42 during the one frame period is set to a substantially constant voltage level. The degradation of the organic light emitting diode (OLED) included in the dummy pixel 62 may be compensated for by the dummy data (DData) generated in the counter 65.

The timer 67 measures a light emitting time of the dummy pixel 42. For example, the timer 67 may measure a light emitting time of the dummy pixel 42 by integrating the dummy data (DData).

The first controller 66 stores the dummy data (DData) and the light emitting time of the dummy pixel 42 in the first memory 68 at set intervals. That is to say, the first controller 66 stores the light emitting time of the dummy pixel 42 and the dummy data (DData) corresponding to the light emitting time in the first memory 68. For example, the first controller 66 may store an adjusted bit value (for example, an increase of 1 bit) of the dummy data (DData), which may correspond to a light emitting time of 1000 hours, in the first memory 68.

The timing controller 50 according to one exemplary embodiment of the present invention includes a second controller 51 and a second memory 52. The timing controller 50 may further include a component generating a synchronization signal, or other components, but only the second controller 51 and the second memory 52 are described in more detail for the sake of convenience.

The second controller 51 supplies the dummy data (DData) from the degradation compensator 60 to the data driver 20. Also, the second controller 51 integrates the first data (Data1) supplied from the outside and stores the integrated data in the second memory 52.

The second controller 51 generates second data (Data2) using the integrated data stored in the second memory 52 and the dummy data (DData), and supplies the generated second data (Data2) to the data driver 20.

More particularly, the second controller 51 receiving first data (Data1) to be supplied to a specific pixel 40 determines a light emitting time of the specific pixel 40 based on the integrated data corresponding to the specific pixel 40. The second controller 51 detects an adjusted bit value of the dummy data (DData) from the first memory 68. In this case, the adjusted bit value of the dummy data (DData) corresponds to the light emitting time of the specific pixel 40. The controller 51 generates a second data (Data2) by adjusting a bit value of the first data (Data1) in accordance with the dummy data (DData), and supplies the generated second data (Data2) to the data driver 20.

The second memory 52 stores the integrated data of each of the pixels 40. The integrated data includes information on the light emitting time of each of the pixels 40 on a per pixel basis.

Hereinafter, the above-mentioned method of driving an organic light emitting display device according to the exemplary embodiment of the present invention will be described in more detail. First, the dummy pixel 42 emits light to correspond to the dummy data (DData). The brightness of the dummy pixel 42 is measured in the photosensor 61, and the measured brightness value is amplified in the amplifier 62, and supplied as a sense voltage to the comparator 63.

The comparator 63 compares the sense voltage with a reference voltage, and supplies a signal corresponding to the comparison result to the counter 65. The counter 65 adjusts a bit value of the dummy data (DData) so that the sense voltage substantially matches the reference voltage, and supplies the adjusted bit value of the dummy data (DData) to the second controller 51. Then, the second controller 51 supplies the adjusted bit value of the dummy data (DData) to the data driver 20.

The degradation compensator 60 and the timing controller 50 maintain a constant brightness of the dummy pixel 42 regardless of the degradation of the organic light emitting diode by repeating the above-mentioned procedures. The first controller 66 receives a light emitting time of the dummy pixel 42 from the timer 67, and stores the dummy data (DData) in the first memory 68 at set intervals. The first memory 68 stores the light emitting time, and the dummy data (DData) includes information of the light emitting time.

The second controller 51 generates an integrated data by integrating the first data (Data1) of each of the pixels 40, and stores the integrated data in the second memory 52. The second controller 51 recognizes a light emitting time of a specific pixel from the second memory 52, and extracts an adjusted bit value corresponding to the light emitting time from the first memory 68 when first data (Data1) of the specific pixel is inputted into the second controller 51. The second controller 51 adjusts a bit value of the first data (Data1) to generate a second data (Data2), and supplies the generated second data (Data2) to the data driver 20.

The data driver 20 generates a data signal using the second data (Data2), and supplies the generated data signal to the specific pixel.

In this case, since a data signal supplied to the specific pixel is generated by the second data (Data2), that is, since a data signal is supplied to the specific pixel to compensate for the degradation of the organic light emitting diode in the specific pixel, the specific pixel may display an image with a desired brightness regardless of degradation of the organic light emitting diode.

The above-mentioned degradation compensation may be represented by the following Equation 1.

$$\text{Data2}=\text{Data1}\times F(t)/D\text{Data(initial value)} \qquad \text{Equation 1}$$

In the Equation 1, DData (initial value) may represent an initial dummy data. F(t) may represent a function showing the changes in the dummy data (DData) according to the time measured in the dummy pixel 42.

As shown in the Equation 1, when there is a light emitting time, t, of each of the pixels 40, the function may be used to calculate the second data (Data2) for maintaining a constant brightness. Meanwhile, an initial factor is multiplied as shown in the following Equation 2 since a bit value of the second data (Data2) is usually increased in proportion to the first data (Data1).

$$\text{Data2}=\text{Data1}\times F(t)/D\text{Data(initial value)}\times\text{initial factor} \qquad \text{Equation 2}$$

In the Equation 2, an initial factor represents an initial period of use in one frame period. For example, when the initial factor is set to 0.7, a pixel displays an image during 70% of one frame period when the pixel is in an initial state, as shown in FIG. 4A.

While the present invention has been described in connection with certain exemplary embodiments, it is to be understood that the invention is not limited to the disclosed embodiments, but is instead intended to cover various modifications and equivalent arrangements included within the spirit and scope of the appended claims, and equivalents thereof.

What is claimed is:

1. An organic light emitting display device, comprising:

a scan driver for supplying scan signals to a plurality of scan lines during subframes of a frame;

a data driver for generating image data signals utilizing second data and a dummy data signal utilizing dummy data;

a plurality of pixels in an active region of the organic light emitting display device configured to emit light in accordance with the image data signals;

a dummy pixel in a dummy region of the organic light emitting display device configured to emit light in accordance with the dummy data signal;

a degradation compensator for adjusting a bit value of the dummy data to maintain a substantially constant brightness of the dummy pixel by adjusting a light emitting period of the frame for the dummy pixel, and for storing the adjusted bit value; and a timing controller for summing first data for each of the plurality of pixels to generate integrated data, and for generating the second data by adjusting the first data in accordance with the adjusted bit value and the integrated data;

wherein the degradation compensator comprises:

a photosensor for sensing a light of the dummy pixel and for generating a corresponding signal;

an amplifier for amplifying the signal from the photosensor;

a reference voltage generator for generating a reference voltage;

a comparator for comparing the amplified signal from the amplifier with the reference voltage and for generating comparison results; and a counter for receiving the comparison results from the comparator and for adjusting the bit value of the dummy data to substantially match the amplified signal to the reference voltage.

2. The organic light emitting display device according to claim 1, wherein the reference voltage is based on the amplified signal of the dummy pixel before an organic light emitting diode of the dummy pixel begins degrading.

3. The organic light emitting display device according to claim 1, wherein the timing controller is configured to receive the dummy data from the counter and to supply the dummy data to the data driver.

4. The organic light emitting display device according to claim 1, wherein the degradation compensator further comprises:

a timer for measuring a light emitting time for the dummy pixel, and a first controller for storing the dummy data in a first memory, the dummy data corresponding to the light emitting time and the light emitting period of the frame corresponding to the light emitting time.

5. The organic light emitting display device according to claim 4, wherein the timer is configured to measure the light emitting time by integrating the dummy data.

6. The organic light emitting display device according to claim 1, wherein the timing controller comprises:

a second controller for summing the first data for each of the plurality of pixels; and a second memory for storing the integrated data for each of the plurality of pixels.

7. The organic light emitting display device according to claim 6, wherein the second controller is configured to retrieve a light emitting time for a specific pixel of the plurality of pixels from the integrated data for the specific pixel when the first data for the specific pixel is received, and to generate the second data for the specific pixel in accordance with the light emitting time and the adjusted bit value of the dummy data.

8. The organic light emitting display device according to claim 7, wherein the second controller is configured to generate the second data to compensate for the degradation of an organic light emitting diode of the specific pixel.

9. An organic light emitting display device, comprising:

a scan driver for supplying scan signals to a plurality of scan lines during subframes of a frame;

a data driver for generating image data signals utilizing second data and a dummy data signal utilizing dummy data;

a plurality of pixels in an active region of the organic light emitting display device configured to emit light in accordance with the image data signals;

a dummy pixel in a dummy region of the organic light emitting display device configured to emit light in accordance with the dummy data signal;

a degradation compensator for adjusting a bit value of the dummy data to maintain a substantially constant brightness of the dummy pixel by adjusting a light emitting period of the frame for the dummy pixel, and for storing the adjusted bit value; and a timing controller for summing first data for each of the plurality of pixels to generate integrated data, and for generating the second data by adjusting the first data in accordance with the adjusted bit value and the integrated data, the timing controller comprising a second controller for summing the first data for each of the plurality of pixels, and a second memory for storing the integrated data for each of the plurality of pixels;

wherein the second controller is configured to retrieve a light emitting time for a specific pixel of the plurality of pixels from the integrated data for the specific pixel when the first data for the specific pixel is received, and to generate the second data for the specific pixel in accordance with the light emitting time and the adjusted bit value of the dummy data.

10. The organic light emitting display device according to claim 9, wherein the degradation compensator comprises:

a photosensor for sensing a light of the dummy pixel and for generating a corresponding signal;

an amplifier for amplifying the signal from the photosensor;

a reference voltage generator for generating, a reference voltage;

a comparator for comparing the amplified signal from the amplifier with the reference voltage and for generating comparison results; and a counter for receiving the comparison results from the comparator and for adjusting the bit value of the dummy data to substantially match the amplified signal to the reference voltage.

11. The organic light emitting display device according to claim 10, wherein the reference voltage is based on the amplified signal of the dummy pixel before an organic light emitting diode of the dummy pixel begins degrading.

12. The organic light emitting display device according to claim 10, wherein the timing controller is configured to receive the dummy data from the counter and to supply the dummy data to the data driver.

13. The organic light emitting display device according to claim 10, wherein the degradation compensator further comprises:

a timer for measuring a light emitting time for the dummy pixel, and a first controller for storing the dummy data in a first memory, the dummy data corresponding to the light emitting time and the light emitting period of the frame corresponding to the light emitting time.

14. The organic light emitting display device according to claim 13, wherein the timer is configured to measure the light emitting time by integrating the dummy data.

15. The organic light emitting display device according to claim 9, wherein the second controller is configured to generate the second data to compensate for the degradation of an organic light emitting diode of the specific pixel.

* * * * *